July 17, 1923.  
A. J. RAASCH ET AL  
POTATO DIGGER  
Filed Feb. 1, 1921  
1,461,935  
3 Sheets-Sheet 1
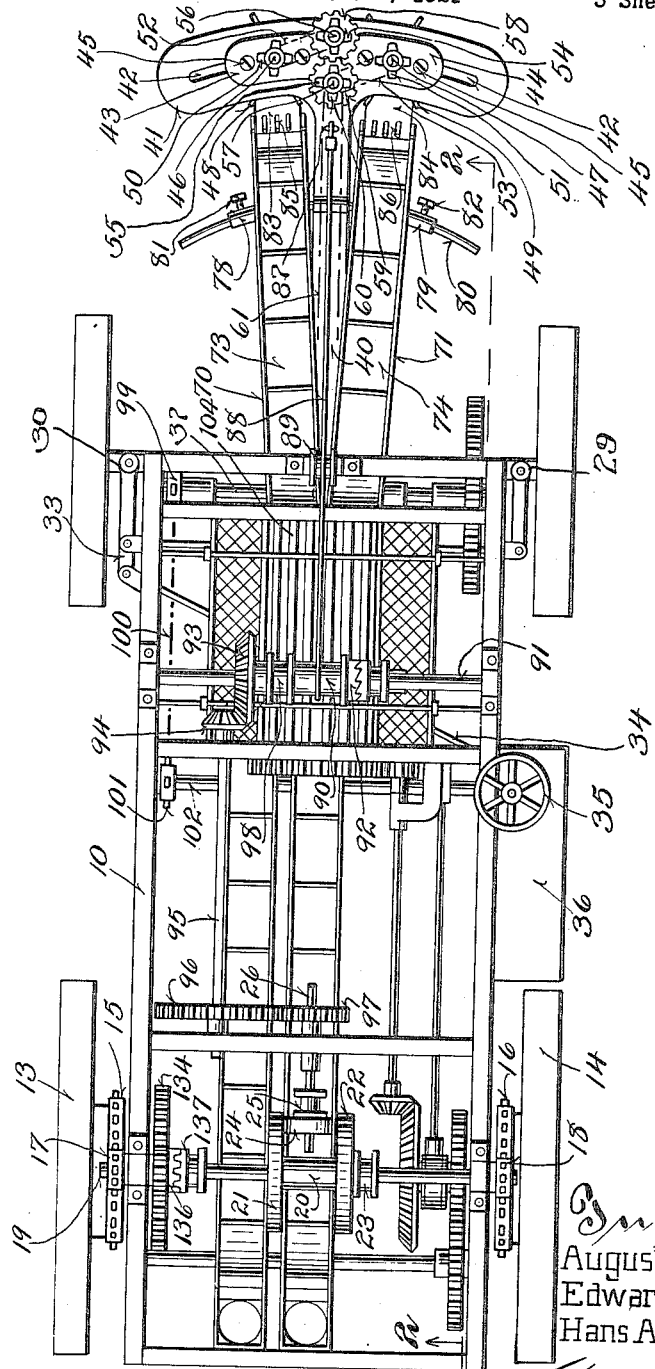
Inventors  
August J. Raasch  
Edward H. Raasch  
Hans A. Olsen

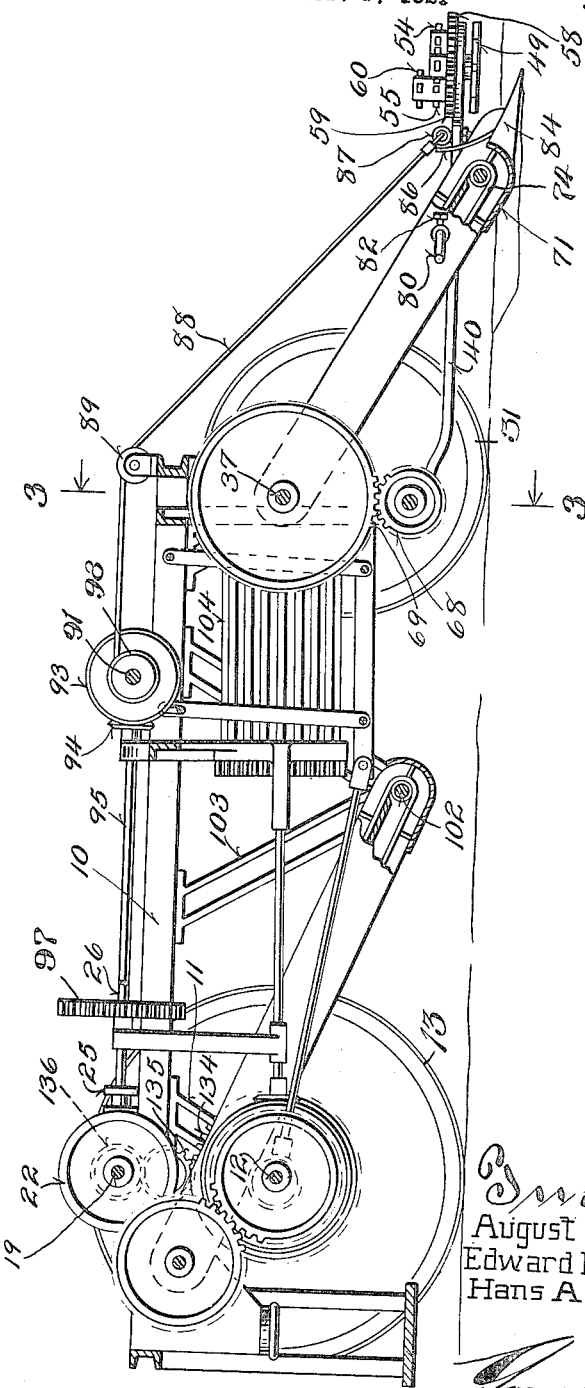

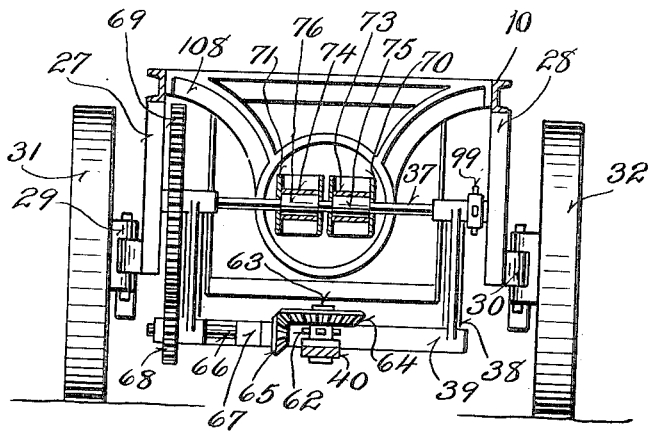
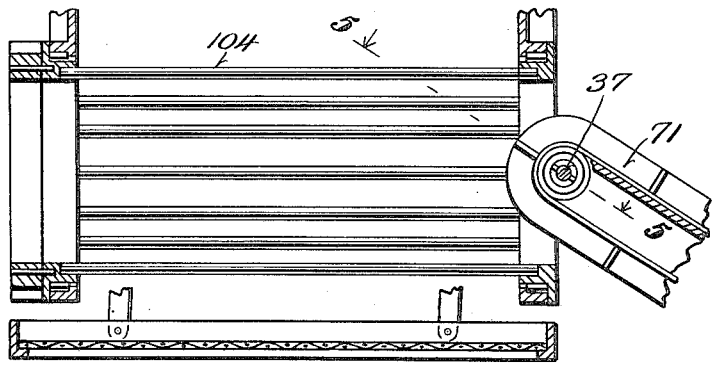
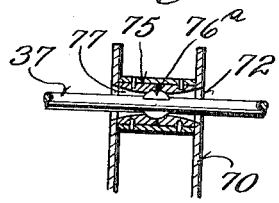

Patented July 17, 1923.

1,461,935

UNITED STATES PATENT OFFICE.

AUGUST J. RAASCH, EDWARD H. RAASCH, AND HANS A. OLSEN, OF MILWAUKEE, WISCONSIN.

POTATO DIGGER.

Application filed February 1, 1921. Serial No. 441,558.

*To all whom it may concern:*

Be it known that we, AUGUST J. RAASCH, EDWARD H. RAASCH, and HANS A. OLSEN, all citizens of the United States, and residents of Milwaukee, in the county of Milwaukee and State of Wisconsin, have invented certain new and useful Improvements in Potato Diggers; and we do hereby declare that the following is a full, clear, and exact description thereof.

Our invention relates to potato diggers and comprises a device which includes in a unitary machine means for digging the potatoes from the ground, means for removing the tops therefrom, means for separating the large potatoes from the rest of the material dug up, and means for removing the dirt from the small potatoes.

One important object of the invention is to provide means for digging a plurality of rows simultaneously and providing means for adjusting the lateral distance between the mechanisms for the different rows, so as to allow for rows which are different distances apart.

Another object of the invention is to provide means by which the digging mechanism may be readily adjusted by power means to any height desired.

A further object of the invention is to provide improved mechanism by which the large and small potatoes will be separated from each other and cleaned.

Our invention also includes details in structure and combination of parts which will be readily apparent as the description proceeds, and which will be subsequently pointed out more particularly in the appended claims.

In the accompanying drawings,

Figure 1 is a plan view of the machine.

Figure 2 is a vertical longitudinal section taken on the line 2—2 of Figure 1.

Figure 3 is a vertical transverse section on the line 3—3 of Figure 2.

Figure 4 is a vertical longitudinal section of the separating and cleaning mechanism with the conveyor for delivering the material thereto, and Figure 5 is a detail sectional view on the line 5—5 of Figure 4.

Referring now to the drawings more in detail, the device comprises a vehicle having the frame 10, which is provided at its rear end with the depending brackets 11, in which is journalled the transverse shaft 12 on the ends of which are revolubly mounted the supporting wheels 13 and 14. Carried by the hubs of the supporting wheels are sprocket wheels 15 and 16, which are driven from the sprocket wheels 17 and 18 mounted on the ends of a transverse shaft 19, which is journalled in the frame 10. A sleeve 20 is keyed to the shaft 19 and is provided with the friction gears 21 and 22, and said sleeve may be moved longitudinally of the shaft 19 by means of the collar 23, so that either of the wheels 21 or 22 will frictionally engage the friction driving gear 24, which is driven through the clutch 25 from the power shaft 26, which is connected to any suitable source of power. The front end of the frame 10 is provided with the lateral depending members 27 and 28, the lower ends of which are connected by the knuckles 29 and 30 to the forward steering wheels 31 and 32, which are steered by the usual lever 33, which is connected by the rod 34 with the steering wheel 35. A platform 36 is supported upon the frame in a convenient place for the operator.

A transverse shaft 37 is journalled in the depending side members 27 and 28, and supports the yoke 38, the lower horizontal portion 39 of which carries a forwardly extending beam 40, which carries at its forward end the arcuate cross head 41. Centrally of the cross head 41 is a slot 42, which is concentric with the rear end of the beam 40. Mounted in the slot 42 are the plates 43 and 44, which may be adjusted laterally in the slot and are secured in their position of adjustment by the screws 45. Journalled in the plates 43 and 44 are the vertical stub shafts 46 and 47, which carry at their lower ends the reels 48 and 49, which as they rotate cast the tops to one side. Mounted on the upper ends of the stub shafts 46 and 47 are the sprocket wheels 50 and 51, which are connected by chains 52 and 53 to the sprocket wheels 54 and 55, which are mounted on the upper ends of the stub shafts 56 and 57 which are journalled in the cross head 41. The shafts 56 and 57 are operably connected to each other by the spur gears 58 and 59. The upper end of the stub shaft 57 is provided with another sprocket wheel 60, which is driven by means of the sprocket chain 61 from the sprocket wheel 62 on the vertical stub shaft 63, which is carried by the horizontal portion 39 of the yoke. The stub shaft 63 is driven through the beveled gear 64 by the beveled pinion 65, which is carried on the end of the shaft 66 mounted in bearings 67 on said yoke. The shaft 66 is connected by the spur gears 68 and 69 to the shaft 37, which is driven by means which will later be described. Conveyor frames 70 and 71 are mounted at their rear ends on the shaft 37, and in order to permit these frames to be swung laterally, a comparatively large opening 72 is provided in each of the conveyor frames to receive the shaft 37. Endless conveyors 73 and 74 are mounted to operate in the conveyor frames and at their upper ends pass over rollers 75 and 76, which are keyed to the shaft 37 by segment shaped keys 76ª. The interior of the rollers is cut away as shown at 77, in order to permit the conveyors to be adjusted laterally. The conveyor frames are provided with the laterally extending sleeves 78 and 79, which slidably engage the arcuate rod 80 which is carried by the beam 40. Set screws 81 and 82 are provided for securing the sleeves 78 and 79 in their adjusted position. Extending from the forward end of the conveyor frames are scoops or plows 83 and 84, which are driven into the ground underneath the hills of potatoes as will be readily understood.

The upstanding teeth 85 and 86 are provided at the rear ends of the scoops, in order to prevent weeds and trash from being delivered to the conveyors. It will be understood that the conveyors may be laterally adjusted to correspond with the width between the rows of potatoes, and the plates 43 and 44, which carry the reels, will be correspondingly adjusted, the sprocket chains 52 and 53 being of adjustable length to permit this adjustment. The beam 40 is provided with an eye bolt 87 to which is connected the flexible member 88 for the purpose of determining the depth at which the scoops operate. The flexible member 88 passes over the idle sheaves 89 to the windlass 90, which is mounted on the transverse shaft 91 and may be connected to rotate therewith by the clutch 92. The shaft 91 is in continuous driving engagement with the power shaft 26 by means of the beveled gears 93 and 94, the shaft 95 and the spur gears 96 and 97. A brake drum 98 is provided on the windlass 90 for the purpose of maintaining it in its position of adjustment when the clutch 92 is released. When the brake drum 98 is released, the scoop will be lowered by gravity. The transverse shaft 37 is provided with a sprocket wheel 99 which is connected by a sprocket chain 100, with a sprocket wheel 101 on the end of the transverse shaft 102 which is supported by the depending brackets 103 and is driven by means to be hereinafter described.

The shaft 12 is in driving connection with the shaft 19 through the spur gear 134, idler 135 and pinion 136, which may be connected in operative relation to the shaft 19 by means of the clutch 137.

With the clutch 137 open and the drive shaft 26 rotating, the sleeve 20 may be moved by means of the collar 23 so that either the friction wheel 21 or 22 will engage the friction drive wheel 24. With the clutch 25 thrown into engagement with the drive wheel 24, the vehicle will be driven forwardly or rearwardly as desired. The digging mechanism and the reels having been adjusted laterally to the proper width, the machine is driven up to the rows of potatoes and the clutch 137 thrown into engagement. As the machine is driven forward, the scoop having been adjusted to the proper depth, the potatoes and the dirt associated therewith will be delivered to the conveyors 73 and 74. The reels 48 and 49 will throw the tops and weeds and other trash to one side. The potatoes and dirt will be delivered to the forward end of the cage 104.

We claim:

1. A potato digger comprising a vehicle, a plurality of conveyors pivotally connected to the vehicle and extending downwardly and forwardly therefrom, a beam extending downwardly and forwardly from the vehicle and having a plurality of transversely disposed arcuate guides at its forward end concentric with the pivots of the respective conveyors and on which the forward ends of the conveyors are adjustably supported, means for scooping the potatoes from the ground and delivering them onto the conveyors and means for operating the conveyors to deliver the potatoes onto the vehicle.

2. A potato digging machine comprising a vehicle, a beam pivoted on the vehicle and extending forwardly, means for vertically adjusting said beam about its pivot, a plurality of conveyor frames pivoted at one end on the vehicle, and extending downwardly and forwardly, conveyors in said frames a transversely disposed guide rod carried by the beam and having portions concentric with the respective conveyor frame pivots, the lower ends of said conveyor frames being connected for slidable adjustment on said guide rod, and means for removing potatoes from the ground and delivering the same to the conveyor.

3. A potato digging machine comprising a vehicle, a beam supported on the vehicle and extended forwardly, means for vertically adjusting said beam about its pivot, a plurality of conveyor frames pivoted at one end on the vehicle and extending downwardly and forwardly conveyors in said frames, a transversely disposed guide rod carried by the beam and having portions concentric with the respective conveyor frame pivots, the lower ends of said conveyor frames being connected for slidable adjustment on said guide rods, means carried by the lower ends of the conveyors for removing potatoes from the ground and delivering the same to the conveyor, a cross head carried by the forward end of the beam, and laterally adjustable means carried by said cross head for removing the tops from the potatoes as they are removed from the ground and delivered to the respective conveyors.

4. A potato digging machine comprising a vehicle, a beam supported on the vehicle and extended forwardly, means for vertically adjusting said beam about its pivot, a plurality of conveyor frames pivoted at one end on the vehicle and extending downwardly and forwardly, conveyors in said frames, a transversely disposed guide rod carried by the beam and having portions concentric with the respective conveyor frame pivots, the lower ends of said conveyor frames being connected for slidable adjustment on said guide rods, means carried by the lower ends of the conveyors for removing potatoes from the ground and delivering the same to the conveyor, a cross head carried by the forward end of the beam, and top removing means comprising reels mounted on vertical axes and laterally adjustable on said cross head to correspond with the adjustment of the potato removing means, and means for positively rotating said reels.

In testimony that we claim the foregoing we have hereunto set our hands at Milwaukee, in the county of Milwaukee and State of Wisconsin.

AUGUST J. RAASCH.
EDWARD H. RAASCH.
HANS A. OLSEN.